UNITED STATES PATENT OFFICE.

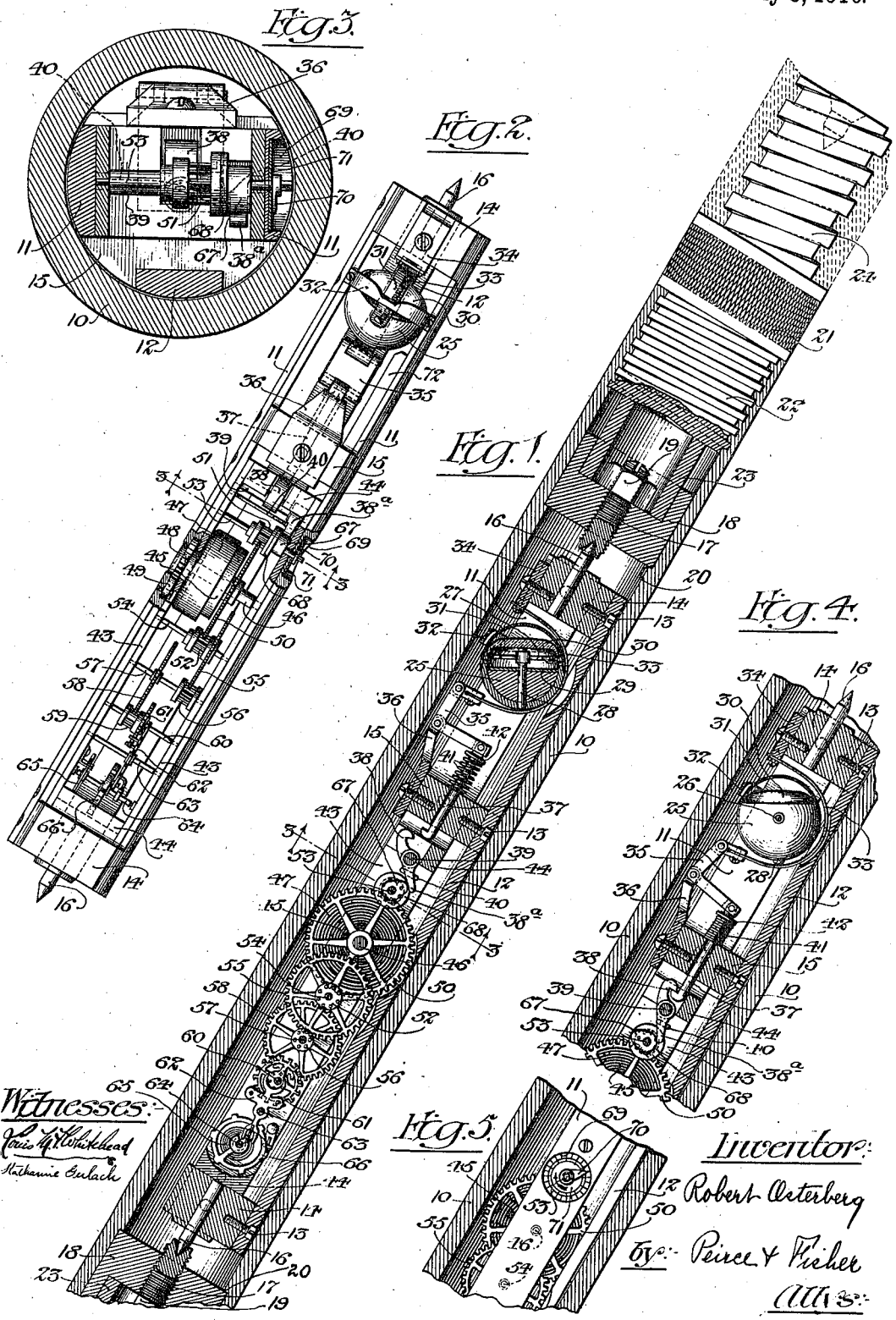

ROBERT OSTERBERG, OF NORWAY, MICHIGAN, ASSIGNOR TO SULLIVAN MACHINERY COMPANY, OF CHICAGO, ILLINOIS, A CORPORATION.

MEASURING INSTRUMENT.

963,242.  Specification of Letters Patent.  Patented July 5, 1910.

Application filed November 20, 1908. Serial No. 463,512.

*To all whom it may concern:*

Be it known that I, ROBERT OSTERBERG, a citizen of the United States, and a resident of Norway, county of Dickinson, and State of Michigan, have invented certain new and useful Improvements in Measuring Instruments, of which the following is a specification.

The invention relates to measuring instruments and seeks to provide a simple and effective device for determining the dip or inclination and direction of the inclination of holes formed by drills in prospecting for ore and the like.

In prospecting for ore and the like with a diamond drill, holes are frequently formed many hundreds of feet deep and the drill rod and drill are frequently deflected to one side or the other of the vertical. If a vein of ore is struck, the length of the hole through the vein may be measured, but this measurement gives no accurate information as to the thickness of the vein unless the dip or inclination of the hole formed by the drill is determined. The present improvement provides a simple mechanism for determining this angle or dip and also the direction of inclination.

The invention consists in the features of construction, combinations and arrangement of parts hereinafter set forth, illustrated in the accompanying drawings and more particularly pointed out in the appended claims.

In the drawings Figure 1 is a view in longitudinal section of the improved measuring instrument. Fig. 2 is a plan view of the movable support and parts carried thereby which is mounted in the casing of the instrument. Fig. 3 is a cross section on the lines 3—3 of Figs. 1 and 2. Fig. 4 is a sectional view similar to Fig. 1 of a portion of the instrument but with the parts shown in different position. Fig. 5 is a detail view of a portion of the instrument.

The improved instrument comprises a suitable casing, preferably tubular in form and provided with means whereby it may be attached to a section of the drill rod, together with a leveling device and compass mounted within the casing and which, when inserted in the hole, coöperates with a suitable scale to indicate the inclination of the hole. Suitable clamping means are provided for holding the leveling device and compass needle against movement and means are provided for automatically setting the clamping means into operation when the instrument is in proper position within the hole so that the instrument may be withdrawn and the inclination and direction of the hole determined by an inspection thereof.

As shown in the drawings, the operative parts of the instrument are arranged within a strong tubular casing 10 and are preferably mounted upon a support pivoted to swing within the casing upon a longitudinal axis. The support comprises a pair of side bars 11 and a longitudinally extending bar 12 which are secured by screws 13 to the end pieces 14 of the support and to an intermediate cross piece 15. The bar 12 is arranged between the side bars 11 and on one side of the axis of the support. Pointed pivot pins 16 are fixed to the end pieces 14 of the support and engage conical seats formed in the ends of bearing screws 17. These bearing screws are adjustably threaded through the heads 18 and are held in adjusted position by lock nuts 19. The heads 18 are removably inserted in the enlarged outer portions of the bore of the tubular casing 10 and are held in position against shoulders 20 within the casing by the end or cap pieces 21. Each cap-piece is provided with a reduced screw portion 22 threaded into the ends of the casing 10 and each having a cylindrical flange 23 which enters a seat in the outer face of the head 18 and holds the latter securely in position. The outer reduced end portion 24 of the cap piece is threaded so that it may be detachably secured to one of the sections of the drill rod. Only one of these cap pieces is shown in the drawings but it is understood that the other cap piece is similar in construction.

The leveling device is mounted to swing on a transverse pivot between the side bars 11 of the longitudinally pivoted support and is preferably in the form of a small compass having a semi-spherical body 25 connected by pivots 26 to the side bars 11 of the support so that the compass is free to swing upon a transverse axis. The body of the compass is weighted on one side of its axis and tends to assume a horizontal position, as shown in the drawings. It is provided with a suitable needle 27 mounted on an axis or shaft 28 which is shiftable longitudinally to a slight extent within the body of the compass. The compass is also provided with a dial 29 and a glass 30.

In operation the instrument is attached to the end of the drill rod and lowered into the hole until the desired point is reached at which the measurement is to be taken. The bar 12 of the swinging support provides a weight therefor on one side of the axis and the support is accurately balanced so that, whatever the position of the casing, the support will assume a position such that a vertical plane passed through its longitudinal axis and pivot points, will be at right angles to the axis upon which the leveling compass swings. The axis of the leveling compass is thus always held in a horizontal plane. The compass itself will assume a horizontal position upon its axis and will shift relatively to the support 11 to a greater or less extent in accordance with the inclination of the support and tubular casing. The dip or inclination of the hole or its angle to the horizontal is thus indicated by a semi-circular, angle-indicating scale 31 fixed to the leveling compass and coöperating with a semi-circular strip 32 which is fixed in transverse position upon the side bars 11 of the support and which acts as a pointer to indicate the angle upon the scale 31. The compass needle 27 of course coöperates with the dial 29 to indicate the direction in which the hole is inclined.

Suitable means are provided which may be automatically set into operation at the proper time to secure the leveling compass and its needle against movement so that the instrument may be withdrawn and the dip and direction of the hole ascertained by an inspection thereof. For this purpose, a clamping device in the form of a flexible band 33 extends about the leveling compass and is secured at one end to a part 34 on the end piece 14 of the support and, at its other end, is pivotally connected to one arm of a bell crank 35. The bell crank is pivoted to a part 36 that is fixed to and projects from the cross piece 15. The other arm of the bell crank is pivoted to a rod 37 which slides through an opening in the cross piece 15 and has a hook at its end which is arranged to be engaged by the hooked end of a dog or latch 38, as shown in Fig. 4. This dog is mounted upon a cross shaft 39 extending between the side bars 11 of the support and a light spring 40 engages an arm 38ª on the shaft 39 and holds the hooked end of the latch 38 in engagement with the hooked end of the rod 37. A spring 41 is coiled about the rod 37 and extends between the cross piece 15 and a washer 42 on the outer pivoted end of the rod. When the rod is in engagement with the latch, as shown in Fig. 4, this spring is held under compression and the clamp or friction band 33 is held out of engagement with the leveling compass so that the latter is free to move.

Suitable means are provided for automatically tripping the latch 38 when the instrument is in proper position within the hole so as to disengage it from the rod 37. The spring 41 then comes into play and through the bell crank 38 draws the clamp or band 33 snugly against the leveling compass 25 to engage it and frictionally hold it against movement. The shaft 28 of the compass needle projects through the body of the compass, as shown in Figs. 1 and 4, and when the latch is tripped the end of the shaft is engaged by the brake-band 33 and shifted inwardly until its upward end engages the glass 30 so that the compass needle is securely held by the band against movement. It should be noted that the construction of the clamping means or frictional brake-band is such that it will securely engage and hold the leveling compass and its needle against movement whatever may be the relative position between the compass and the swinging support upon which the clamping device is mounted.

Electrically operated devices may be employed for tripping the latch 38 but preferably a clock mechanism is arranged within the casing and upon the swinging support for this purpose. This clock mechanism is mounted upon a frame comprising side-bars 43 and end pieces 44 and is arranged between the side-bars 11 of the swinging support and between one of the end pieces 14 and the cross piece 15 thereof. A coiled drive spring 45 is fixed at the end to a cross shaft 46 and to a casing 47 that is provided with the usual ratchet 48 engaged by a holding pawl 49. The hub 47ª of the casing 47 projects through an opening in one of the side-bars 11 (see Fig. 2) and is provided with a key socket to turn the casing and wind up the drive spring 45. A gear 50 on the shaft 46 engages pinions 51 and 52 that are respectively mounted on the cross shafts 53 and 54. A gear 55 on shaft 54 engages a pinion 56 on a cross shaft 57 and a gear 58 on said shaft engages with a pinion 59 on a cross shaft 60. An escapement wheel 61 on the shaft 60 is controlled by an escapement anchor 62 on a cross shaft 63. A cross shaft 64 is provided with a balance spring 65 and a balance wheel 66 controlling the operation of the escapement anchor 62. It will be understood that any suitable clock train could be employed. The shaft 53, which is rotated by the clock mechanism, is provided with a cam 67 which is arranged to strike the arm 38ª on the shaft 39 after a certain length of time and trip the latch 38 to set the clamping device into operation. The pinion 51 is not rigid within the shaft 53 but is held against movement thereon by a friction washer 68 inserted between the cam 67 and the end of the pinion 51 so that ordinarily the pinion and cam 67 rotate together. The end of the shaft 53 is squared and arranged within a recess 69 in the outer face of one of the side-bars 11 (see Figs. 2, 3 and 5) so that by placing a suitable key on the end of the shaft, it and the cam 67 may be adjusted relatively to the clock train so that more or less time will expire before the latch is tripped by the cam. A pointer 70 on the end of the shaft coöperates with the dial 71 to assist in setting the adjustable cam 67. A weight 72 (see Fig. 2) is secured to one of the side-bars of the swinging support to balance the weight of the drive spring 45 and its casing 47 so that the center of gravity of the swinging support will lie in a plane at right angles to the axis of the leveling compass and thus always holds the axis of the compass in horizontal position.

In operation the drive spring 45 of the clock mechanism is wound up and the cam 67 on the shaft 53 adjusted in accordance with the approximate amount of time required to lower the instrument to the desired position in the hole. The swinging support is then inserted into the casing 10 and arranged in proper position therein between the bearing screws 17. The cap pieces 21 are then threaded into the ends of the tubular casing and the entire instrument secured upon the end of the drill rod and lowered into the hole to the position at which the measurement is to be taken. The clamping means is then automatically set into operation to secure the leveling compass and its needle against movement and the instrument is withdrawn and read by removing it from the casing.

It is obvious that numerous changes may be made in the details set forth without departure from the essentials of the invention.

Having described my invention, what I claim as new and desire to secure by Letters Patent, is:—

1. A measuring instrument of the class described comprising a suitable casing, a support pivotally mounted in said casing, a leveling device pivoted to said support on an axis transverse to the axis of the support, a clamp for holding said leveling device in position on said support and a clock mechanism mounted on said pivoted support for automatically setting said clamp in operative position, substantially as described.

2. A measuring instrument of the class described comprising a suitable casing, a support pivotally mounted in said casing, a leveling device pivoted to said support on an axis transverse to the axis of the support, a spring-actuated clamp mounted on said support for holding said leveling device in position on said support, a latch for holding said clamp out of operation, a clock mechanism mounted on said pivoted support and having an adjustable part for automatically tripping said latch, and an angle indicating scale associated with said leveling device, substantially as described.

3. A measuring instrument of the class described comprising a tubular casing, a support pivotally mounted to swing on a longitudinal axis therein, a leveling device mounted on said support to swing on a transverse axis, said support and leveling device being weighted on one side of their axes to maintain the leveling device in horizontal position, an angle indicating scale associated with said leveling device, a spring-actuated clamp for holding said leveling device against movement upon said transverse axis, a latch on said support for holding said clamp out of operation and a clock mechanism mounted on said pivoted support having an adjustable part for tripping said latch, substantially as described.

4. A measuring instrument of the class described comprising a suitable casing, a leveling compass pivotally mounted to shift universally in said casing and having a swinging needle; a common clamp for holding the compass and the compass needle in positions indicating the dip and direction of inclination of the drill hole, and means in the casing for automatically setting said clamp in operative position, substantially as described.

5. A measuring instrument of the class described comprising a suitable casing, a leveling compass pivotally mounted upon longitudinal and transverse axes to shift universally in said casing and having a swinging needle, a common clamp for holding said needle against movement relative to the compass and for holding said compass against movement upon its transverse axis, and a clock mechanism in said casing for automatically setting said clamp in operative position, substantially as described.

6. A measuring instrument of the class described comprising a suitable casing, a support pivotally mounted in said casing, a leveling compass having a swinging needle, said compass being pivoted to said support on an axis at right angles to the axis of the support, a common clamp on said pivoted support arranged to hold both the compass and the compass needle against movement upon their respective axes, and means in the casing for automatically setting said clamp in operative position, substantially as described.

7. A measuring instrument of the class described comprising a suitable casing, a support pivotally mounted in said casing, a leveling compass having a swinging needle, said compass being pivoted to said support on an axis at right angles to the axis of the support, a common spring-actuated clamp for holding the compass in position on said support and for holding the compass needle in position on said compass, a latch for holding said clamp out of operation and means in the casing for automatically tripping said latch, substantially as described.

8. A measuring instrument of the class described comprising a suitable casing, a support pivotally mounted in said casing, a leveling compass having a swinging needle, said compass being pivoted to said support on an axis at right angles to the axis of the support, a common spring-actuated clamp for holding the compass and the compass needle against movement upon their respective axes, a latch for holding said clamp out of operation and a clock mechanism mounted on said pivoted support and having an adjustable part for automatically tripping said latch, substantially as described.

9. A measuring instrument of the class described comprising a tube, a support pivotally mounted in said tube to swing on a longitudinal axis, a leveling compass having a swinging needle, said compass being mounted on said support to swing on a transverse axis, said support and said compass being weighted on one side of their axes to maintain the compass in horizontal position, clamping means for holding the compass and compass needle against movement upon their respective axes, a latch for holding said clamping means out of operation and a clock mechanism mounted on said pivoted support and having an adjustable part for tripping said latch, substantially as described.

10. A measuring instrument of the class described comprising a tube, a support pivotally mounted in said tube to swing on a longitudinal axis, a leveling compass having a swinging needle, said compass being mounted on said support to swing on a transverse axis, said support and said compass being weighted on one side of their axes to maintain the compass in a horizontal plane, a clamp mounted on said support for holding the compass and the compass needle against movement upon their respective axes, a latch for holding said clamp out of operation, and a clock mechanism mounted on said pivoted support having an adjustable part for automatically tripping said latch, substantially as described.

ROBERT OSTERBERG.

Witnesses:
D. A. STEWART,
V. S. NYSTROM.